(12) United States Patent
Vallinayagam et al.

(10) Patent No.: US 9,473,002 B2
(45) Date of Patent: Oct. 18, 2016

(54) SYSTEM AND METHOD FOR COOLING DYNAMOELECTRIC MACHINE

(71) Applicant: GE Jenbacher GMBH & Co. OG, Jenbach (AT)

(72) Inventors: Sadhasivam Vallinayagam, Madhapur (IN); Tobias Bathon, Jenbach (AT); Erich Kruckenhauser, Jenback (AT)

(73) Assignee: GE JENBACHER GMBH & CO. OG, Jenbach (AT)

(*) Notice: Subject to any disclaimer, the term of this patent is extended or adjusted under 35 U.S.C. 154(b) by 136 days.

(21) Appl. No.: 13/710,589

(22) Filed: Dec. 11, 2012

(65) Prior Publication Data

US 2013/0342044 A1 Dec. 26, 2013

(30) Foreign Application Priority Data

Dec. 14, 2011 (EP) ..................................... 11193584

(51) Int. Cl.
*H02K 9/02* (2006.01)
*H02K 9/04* (2006.01)
*H02K 9/06* (2006.01)
(Continued)

(52) U.S. Cl.
CPC *H02K 9/06* (2013.01); *H02K 5/20* (2013.01); *H02K 9/24* (2013.01); *H02K 11/25* (2016.01); *H02K 9/02* (2013.01); *H02K 9/04* (2013.01);
(Continued)

(58) Field of Classification Search
CPC ............ H02K 9/02; H02K 9/04; H02K 9/06; H02K 5/20; H02K 9/14; H02K 9/005
USPC ................. 310/53, 58, 59, 60 R, 62, 63, 52; 318/400.08, 471
See application file for complete search history.

(56) References Cited

U.S. PATENT DOCUMENTS 900,977 A * 10/1908 Behrend .......................... 310/58
3,643,119 A 2/1972 Lukens
(Continued)

FOREIGN PATENT DOCUMENTS

DE 10004188 8/2001
DE 102009050693 4/2011

OTHER PUBLICATIONS

Schelle (DE 102009050693) English Translation.*
(Continued)

*Primary Examiner* — Quyen Leung
*Assistant Examiner* — Robert E Mates
(74) *Attorney, Agent, or Firm* — GE Global Patent Operation

(57) ABSTRACT

A system for cooling a dynamoelectric machine is provided. The system includes a coolant medium inlet, a coolant medium outlet and a fan connected to a rotor of the dynamoelectric machine, The system further includes a flow control device configured to control the amount of the coolant medium passing through the dynamoelectric machine by controlling an opening area of at least one of the coolant medium inlet and the coolant medium outlet. The system further includes a winding temperature measurement system configured to measure the temperature of one or more windings in the dynamoelectric machine, and control the flow control device by adjusting the opening area of at least one of the coolant medium inlet and the coolant medium outlet based on the temperature of the windings in the dynamoelectric machine to at least one of reduce windage loss and control coolant medium pressure within the dynamoelectric machine.

14 Claims, 6 Drawing Sheets

(51) Int. Cl.
*H02K 5/20* (2006.01)
*H02K 9/24* (2006.01)

(52) U.S. Cl.
CPC ....... *H02K 2205/12* (2013.01); *H02K 2213/09* (2013.01); *Y02E 10/725* (2013.01)

(56) References Cited

U.S. PATENT DOCUMENTS

| | | | |
|---|---|---|---|
| 3,835,663 A * | 9/1974 | Appleton | H01F 6/04 310/52 |
| 5,001,378 A | 3/1991 | Miller et al. | |
| 5,127,485 A * | 7/1992 | Wakuta | B60K 7/0007 180/65.51 |
| 5,354,184 A | 10/1994 | Forni | |
| 5,372,213 A * | 12/1994 | Hasebe | B60K 1/02 180/65.6 |
| 5,433,175 A | 7/1995 | Hughes et al. | |
| 5,828,148 A | 10/1998 | Niggemann et al. | |
| 6,438,820 B1 | 8/2002 | Tong et al. | |
| 6,504,273 B2 | 1/2003 | Tong | |
| 6,882,068 B2 | 4/2005 | Weeber et al. | |
| 7,023,101 B2 | 4/2006 | Wang | |
| 7,057,326 B2 | 6/2006 | Ren et al. | |
| 7,129,604 B1 | 10/2006 | Wang | |
| 7,723,859 B1 | 5/2010 | Grant et al. | |
| 7,755,230 B2 * | 7/2010 | Nakahara et al. | 310/53 |
| 7,919,949 B2 | 4/2011 | Namuduri et al. | |
| 2004/0021320 A1 | 2/2004 | Yamada et al. | |
| 2004/0154573 A1 | 8/2004 | Reutlinger | |
| 2005/0160740 A1 | 7/2005 | Nakano et al. | |
| 2007/0278869 A1 * | 12/2007 | Taketsuna | H02K 3/24 310/54 |
| 2008/0136275 A1 * | 6/2008 | Dreher | H02K 33/02 310/77 |
| 2008/0265699 A1 | 10/2008 | Devine | |
| 2009/0146512 A1 | 6/2009 | Yoshizawa et al. | |
| 2009/0195091 A1 | 8/2009 | Nakahara et al. | |
| 2009/0260584 A1 | 10/2009 | Watakabe et al. | |
| 2010/0095681 A1 | 4/2010 | Enis et al. | |
| 2010/0302730 A1 | 12/2010 | Hernon | |
| 2011/0115235 A1 | 5/2011 | Steffl | |
| 2011/0197851 A1 * | 8/2011 | Parrish et al. | 123/299 |

OTHER PUBLICATIONS

Extended Search Report and Written Opinion from corresponding European Application No. 11193584.7, Dated Jul. 4, 2012.
Fujita, Air-cooled Large Turbine Generator with Multiple-pitched Ventilation Ducts, IEEE, Toshiba Corporation, pp. 910-917, 2005.
Bureau of Energy Efficiency, "Energy Efficiency in Electrical Utilities", Fans and Blowers, Chapter 5, pp. 93-112, Jul. 14, 2014.

* cited by examiner

SYSTEM AND METHOD FOR COOLING DYNAMOELECTRIC MACHINE

BACKGROUND OF THE INVENTION

The subject matter disclosed herein relates generally to a system and method for cooling a dynamoelectric machine. More specifically, the subject matter disclosed herein relates to a system and method for controlling the flow of a cooling medium to improve dynamoelectric machine efficiency.

There are many sources of loss in dynamoelectric machines that can adversely affect machine efficiency, for example, windage loss. Windage loss may be described as power absorbed by the air surrounding the rotor as a result of the relative motion between the stator and the rotor. The power absorbed is supplied by some type of motor or turbine, and this lost or wasted power is not converted into useful energy. It can be seen that windage loss decreases the overall efficiency of the dynamoelectric machine. Another undesirable characteristic of windage loss is that power absorbed is converted into heat which increases the temperature of the stator and/or rotor. The resistance of a conductor (for example, rotor coils or stator coils) increases as the temperature of the conductor increases. As the conductor resistance increases, the overall dynamoelectric machine efficiency decreases.

BRIEF DESCRIPTION OF THE INVENTION

In an aspect of the present invention, a system is provided for cooling a dynamoelectric machine. The system includes a coolant medium inlet, a coolant medium outlet, a fan connected to a rotor of the dynamoelectric machine, a flow control device, and a winding temperature measurement system. The fan is configured to provide a flow of a coolant medium through the dynamoelectric machine. The flow control device is configured to control the amount of the coolant medium passing through the dynamoelectric machine by controlling an opening area of at least one of the coolant medium inlet and the coolant medium outlet. The winding temperature measurement system is configured to measure the temperature of one or more windings in the dynamoelectric machine, and is configured to control the flow control device by adjusting the opening area of at least one of the coolant medium inlet and the coolant medium outlet based on the temperature of the one or more windings in the dynamoelectric machine to at least one of reduce windage loss and control coolant medium pressure within the dynamoelectric machine.

In another aspect of the present invention, a system is provided for cooling a dynamoelectric machine. The system includes at least one coolant medium aperture, a fan, and a flow control device. The fan is configured to provide a flow of a coolant medium through the dynamoelectric machine. The flow control device is configured to control the amount of the coolant medium passing through the dynamoelectric machine by controlling an opening area of the coolant medium aperture. The flow control device adjusts the opening area of the coolant medium aperture to at least one of reduce windage loss and control coolant medium pressure within the dynamoelectric machine.

In yet another aspect of the present invention, a method is provided for cooling a dynamoelectric machine. The dynamoelectric machine includes a coolant medium inlet, a coolant medium outlet, and a fan connected to a rotor of the dynamoelectric machine. The fan provides a flow of a coolant medium through the dynamoelectric machine. The method includes providing a flow control device configured to control the amount of the coolant medium passing through the dynamoelectric machine, and controlling the flow control device to adjust the opening area of at least one of the coolant medium inlet and the coolant medium outlet to at least one of reduce windage loss and control coolant medium pressure within the dynamoelectric machine.

BRIEF DESCRIPTION OF THE DRAWINGS

Embodiments of the present invention will now be described with reference to the accompanying drawings, in which.

DETAILED DESCRIPTION OF EXEMPLARY EMBODIMENTS OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments that also incorporate the recited features.

Figure 1:
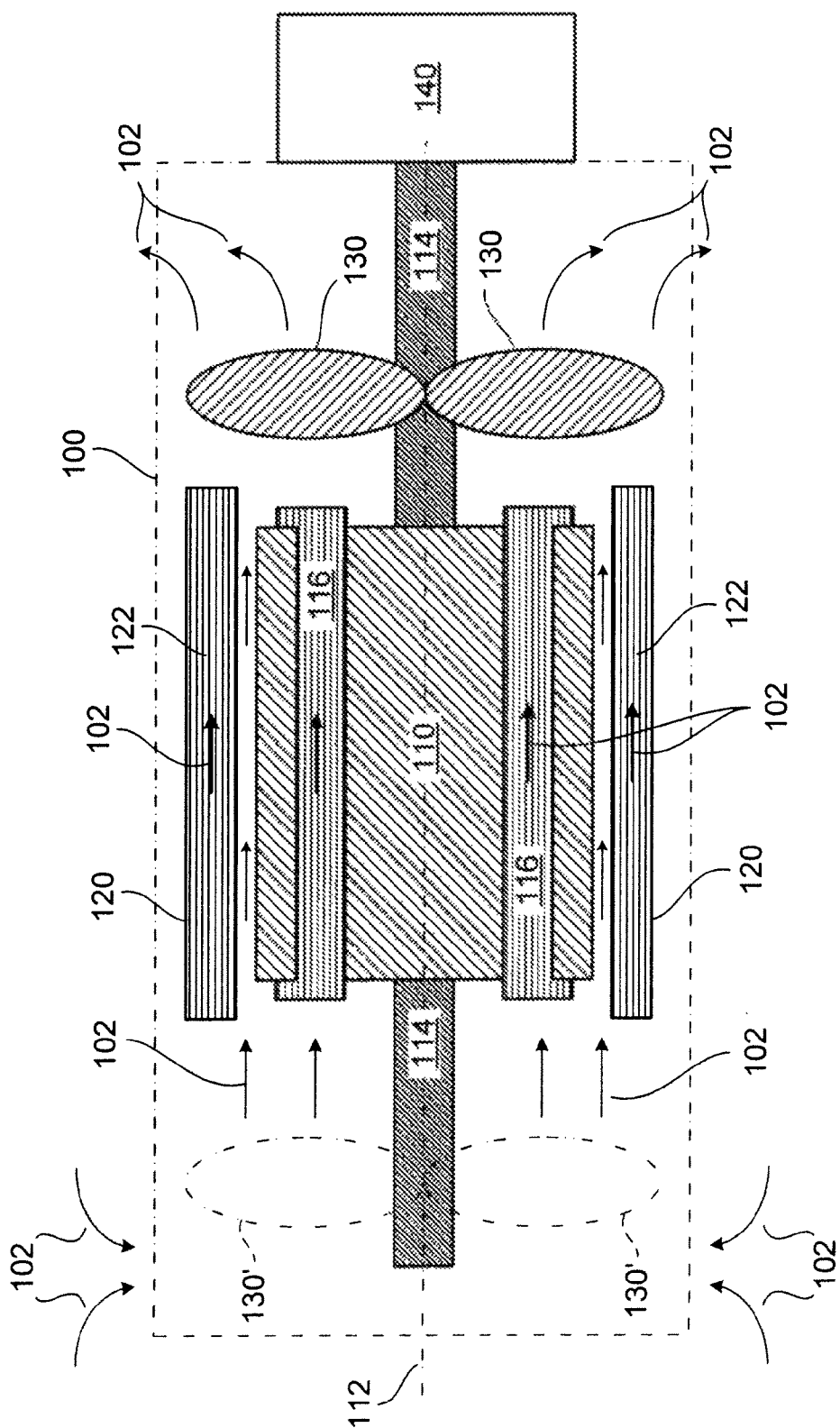
FIG. 1 illustrates a partial side view of a dynamoelectric machine, according to an aspect of the present invention.

FIG. 1 illustrates a partial side view of a dynamoelectric machine 100, according to an aspect of the present invention. A dynamoelectric machine is defined as any machine that converts mechanical energy to electrical energy or vice versa (for example, generators or motors). The dynamoelectric machine 100 includes a rotor 110 and a stator 120. The rotor 110 rotates about a central axis 112. The rotor 110 includes a plurality of rotor windings 116, and the stator 120 may also include stator windings 122. The rotor 110 may include a shaft 114 to which a fan 130 is attached. In alternative embodiments, the fan may be attached to the drive end of shaft 114 (as illustrated by fan 130) and/or the fan may be attached to the non-drive end of shaft 114 (as illustrated by fan 130', shown in phantom). It is to be understood that fan 130 (or 130') may be attached to any suitable location along shaft 114, as desired in the specific application. Further, fan 130 (or 130') may comprise one or more fans. Fan 130 provides suction to pull a flow of a coolant medium through the dynamoelectric machine 100. For example, fan 130 pulls a coolant medium (for example, air) through a coolant medium inlet (not shown in FIG. 1). The coolant medium may pass through the rotor and/or stator, as well as between the rotor and stator, and the coolant medium typically extracts heat from the machine elements as it passes. The coolant medium then enters the fan 130 and is forced out of a coolant medium outlet (not shown in FIG. 1). The flow of coolant medium is illustrated by arrows 102. The fan 130 may be of the centrifugal or axial type. A centrifugal type fan may have radial fan blades, forward curved fan blades or backward inclined fan blades, or any other suitable configuration. An axial type fan may be of the tube axial, vane axial or propeller type. In additional embodiments, the fan 130 may be replaced or augmented by an externally located fan or blower (not shown). The externally located fan or blower could be connected to a coolant medium inlet (not shown in FIG. 1) of machine 100, via suitable ductwork or conduit. A fan or blower may also be considered to be equivalent devices for providing a flow of coolant medium through a dynamoelectric machine.

The dynamoelectric machine 100 may be a generator, and in this example the generator may be driven by a drive 140. Drive 140 may be a gas turbine, a steam turbine, a wind turbine (for example, a rotor or gearbox of a wind turbine), a hydro turbine (for example, powered by water), a motor or engine, or any other suitable apparatus capable of rotating rotor 110 at the desired speed. The dynamoelectric machine 100 may also be a motor, and in this example the drive 140 is the element to be driven, for example, a shaft, an axle or any other desired device or apparatus needing to be driven by a motor.

Figure 2:
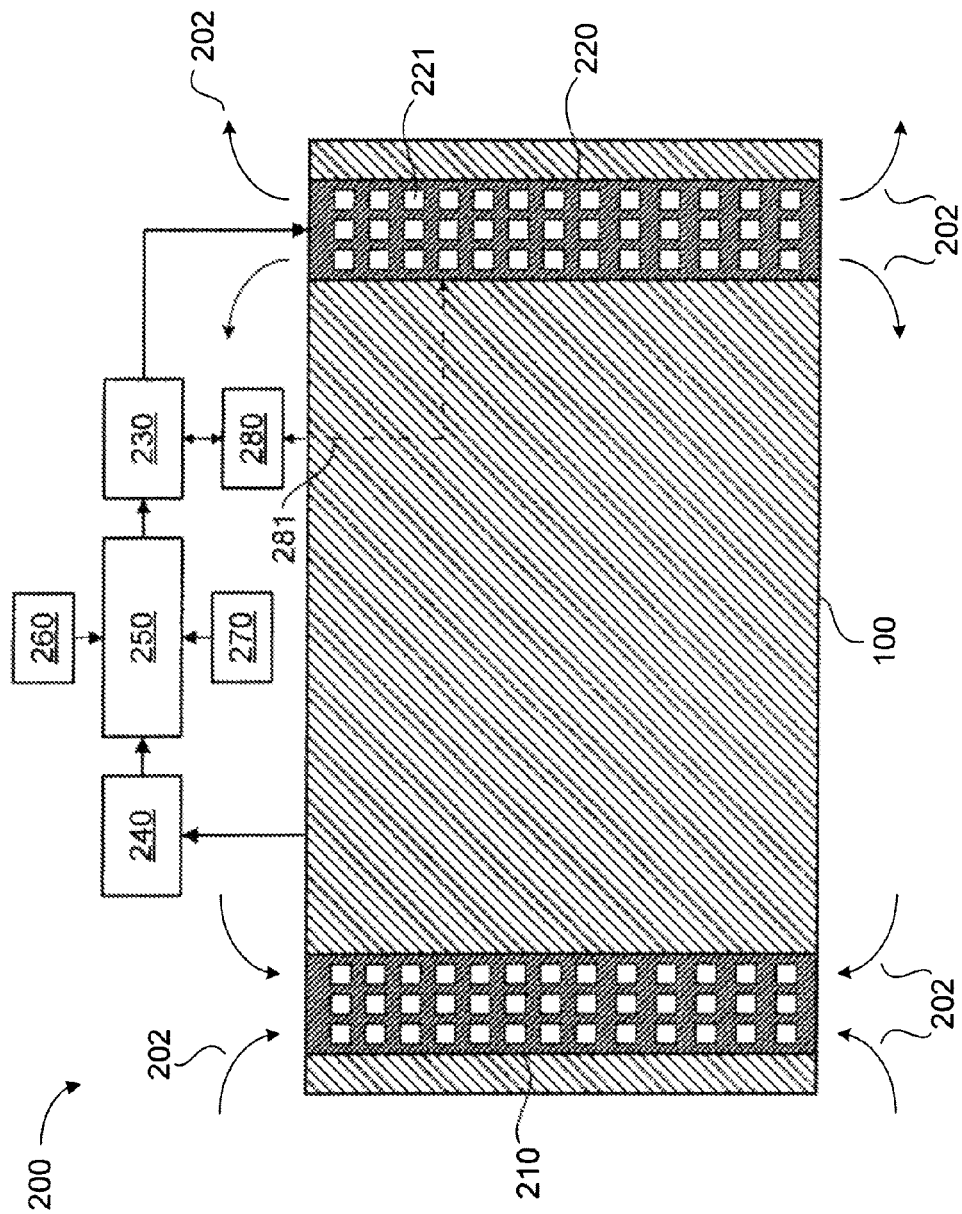
FIG. 2 illustrates a schematic view of a system for cooling a dynamoelectric machine, according to an aspect of the present invention.

FIG. 2 illustrates a schematic view of a system 200 for cooling the dynamoelectric machine 100, according to an aspect of the present invention. The system 200 includes a coolant medium inlet 210 and a coolant medium outlet 220. The coolant medium inlet and the coolant medium outlet may both be referred to as a coolant medium aperture, either alone or combined. The coolant medium could be air or any other suitable coolant medium as desired in the specific application. The flow of the coolant medium is illustrated by arrows 202. The fan 130 (not shown in FIG. 2) is connected to the rotor 110 (not shown in FIG. 2) of the dynamoelectric machine 100, and the fan provides a flow of the coolant medium through the dynamoelectric machine 100.

A flow control device 230 is connected to or located on the coolant medium outlet 220 for reducing windage loss in the dynamoelectric machine 100 by controlling the amount of the coolant medium passing through the dynamoelectric machine 100. The flow control device 230 controls an opening area of the coolant medium outlet. For example, a baffle (not shown in FIG. 2) can be attached to the coolant medium outlet and movement thereof can "open" or "close" the windows or openings 221 in the coolant medium outlet 220. The baffle could be comprised of louvers, partition plates or any other suitable device for adjusting the opening area of windows 221. As shown in FIG. 2, the baffle is 100% open, which results in the maximum window opening and maximum ventilation (or coolant medium flow). The positioning of the baffle (that is, at 100% open) also creates a low pressure environment for the coolant medium within machine 200, as neither the input or output flow of coolant medium is restricted by the baffle.

The flow control device 230 is controlled by a winding temperature measurement system 240 and an optional control system 250. The winding temperature measurement system measures and detects the temperature of one or more windings in the dynamoelectric machine. The windings may be rotor windings and/or stator windings. If the temperature of the windings reaches a predetermined level, the flow control device can increase or decrease the opening area of windows 221. In other words, the winding temperature measurement system 240 controls the flow control device 230 to adjust the opening area of the windows 221 in the coolant medium outlet 220, based on the temperature of the windings in the dynamoelectric machine. This change in opening area of windows 221 will create a corresponding increase or decrease in the volume of coolant medium flow, and by properly adjusting the coolant medium flow volume, the efficiency of the dynamoelectric machine may be enhanced by reducing windage loss.

The flow control device may also be controlled by an ambient temperature sensor 260 and/or a dynamoelectric machine load sensing system 270. The ambient temperature sensor 260 can sense and detect the ambient temperature and/or the temperature of the coolant medium. The load sensing system 270 can sense the load on the dynamoelectric machine 100 and control the flow control device 230 to adjust the opening area of the windows 221 in the coolant medium outlet 220, based on the current load, or predicted load on the dynamoelectric machine 100. In addition, other parameters could also be measured and used to control the flow control device, and some non-limiting examples include one or combinations of: rotor voltage, stator voltage, rotor current, stator current, generator surface body temperature, generator insulation temperature and generator core temperature.

A flow control device monitoring system 280 may be used for monitoring operation of the flow control device 230 and for detecting malfunctions in the flow control device 230 or baffle. In addition, the flow control device monitoring system 280 can be configured to control the flow control device 230 to maximize the opening area of the coolant medium outlet 220, in the event a malfunction in the flow control device 230 is detected.

Figure 3:
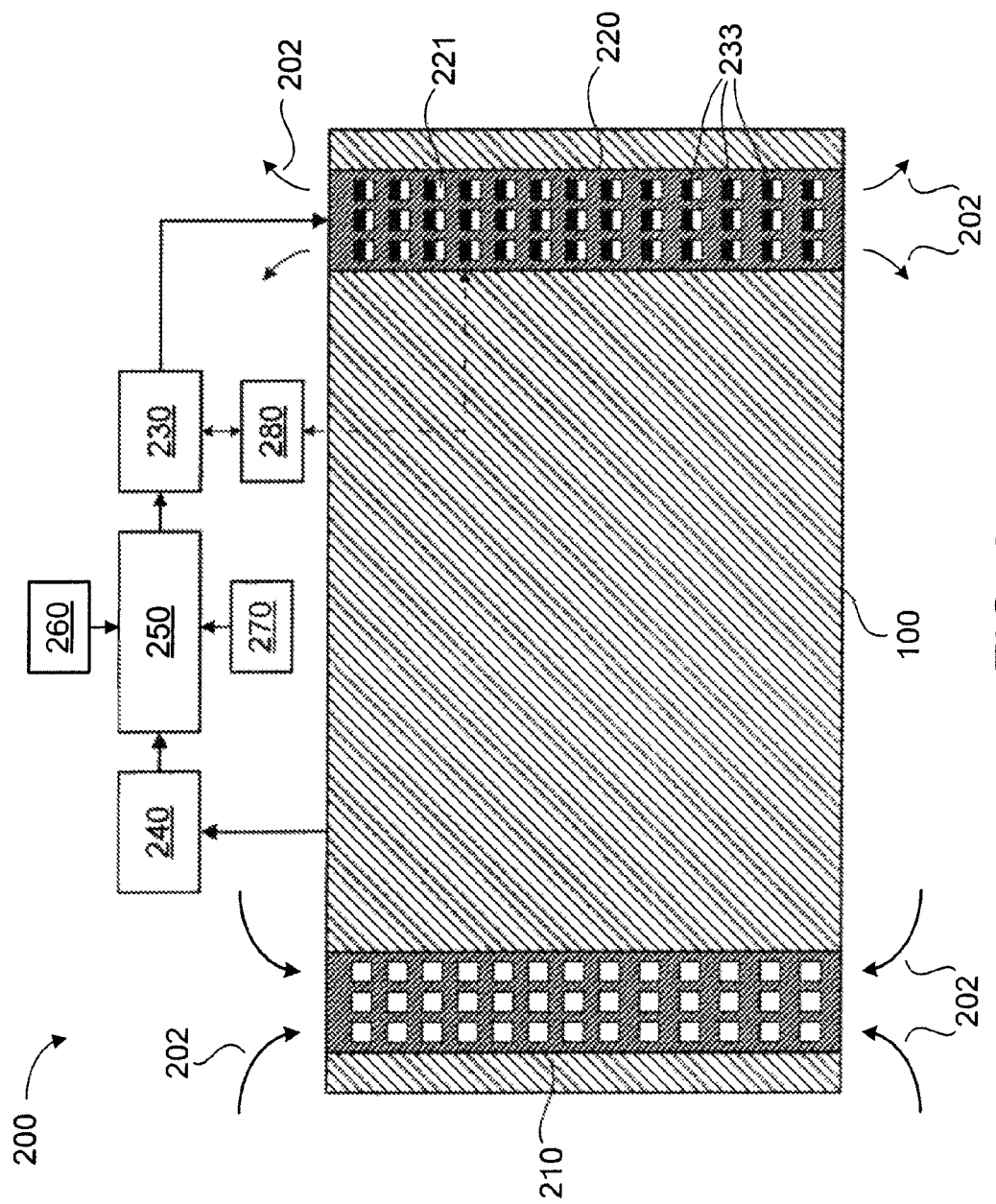
FIG. 3 illustrates a schematic view of a system for cooling a dynamoelectric machine, according to an aspect of the present invention.

FIG. 3 illustrates a schematic view of the system 200 for cooling the dynamoelectric machine 100, according to an aspect of the present invention. The flow control device 230 has the baffle device 233 (or devices) partially closed to reduce an opening area of the coolant medium outlet 220. As non-limiting examples only, the baffle device 233 can be configured to reduce the window 221 opening area to 10%, 20%, 30%, 40%, 50%, 60%, 70%, 80% or 90% (or any value between 0%-fully closed and 100%-fully open) of the maximum window 221 opening area. As shown in FIG. 3, the baffle 233 is about 50% open or closed, which results in about a 50% window opening area and this restricts the amount of coolant medium flow. The positioning of the baffle 233 (that is, at 50% open) also creates a higher pressure of coolant medium within machine 200, as the output flow of coolant medium is restricted by the partially closed baffle 233. This higher pressure of coolant medium can be beneficial by increasing heat transfer (and therefore cooling) of various components (for example, rotor windings, stator windings, etc.) within the dynamoelectric machine 200. The higher pressure of coolant medium caused by partially or fully closing baffle 233 may be applied to dynamoelectric machines having internal and/or external cooling fans or blowers.

The control system 250 may also have storage means for storing a history of machine parameters, machine events or external conditions. For example, the storage means could store ambient temperature and details of the position of baffles 233. The data can be stored at any desired temporal resolution, for example, 1 second, 1 minute, 1 hour, 1 day, or any other desired time period. Historical operating information can be used to reduce the response time of the overall system.

The flow control device monitoring system 280 may receive feedback (illustrated by line 281) from the baffles 233 or other sensors to monitor proper operation. For example, if the flow control device 230 commands the baffles 233 to close to 50%, then feedback from baffles 233 or other sensors can confirm if the command was successfully completed. If a malfunction occurs (for example, the baffles do not open or close by the desired amount), then an alarm can be generated and transmitted. The alarm could be visual, audible or an electronic signal. The alarm indication could be located on the machine, machine panel, flow control device or be remotely located in a control room, operator room or portable device (for example, mobile telephone, mobile computer, etc.). The alarm could be transmitted by wired or wireless communication channels. Further, in the event of a malfunction, the system can open the baffle to 100% open as a fail safe mode to protect the dynamoelectric machine from overheating or other issues.

Figure 4:
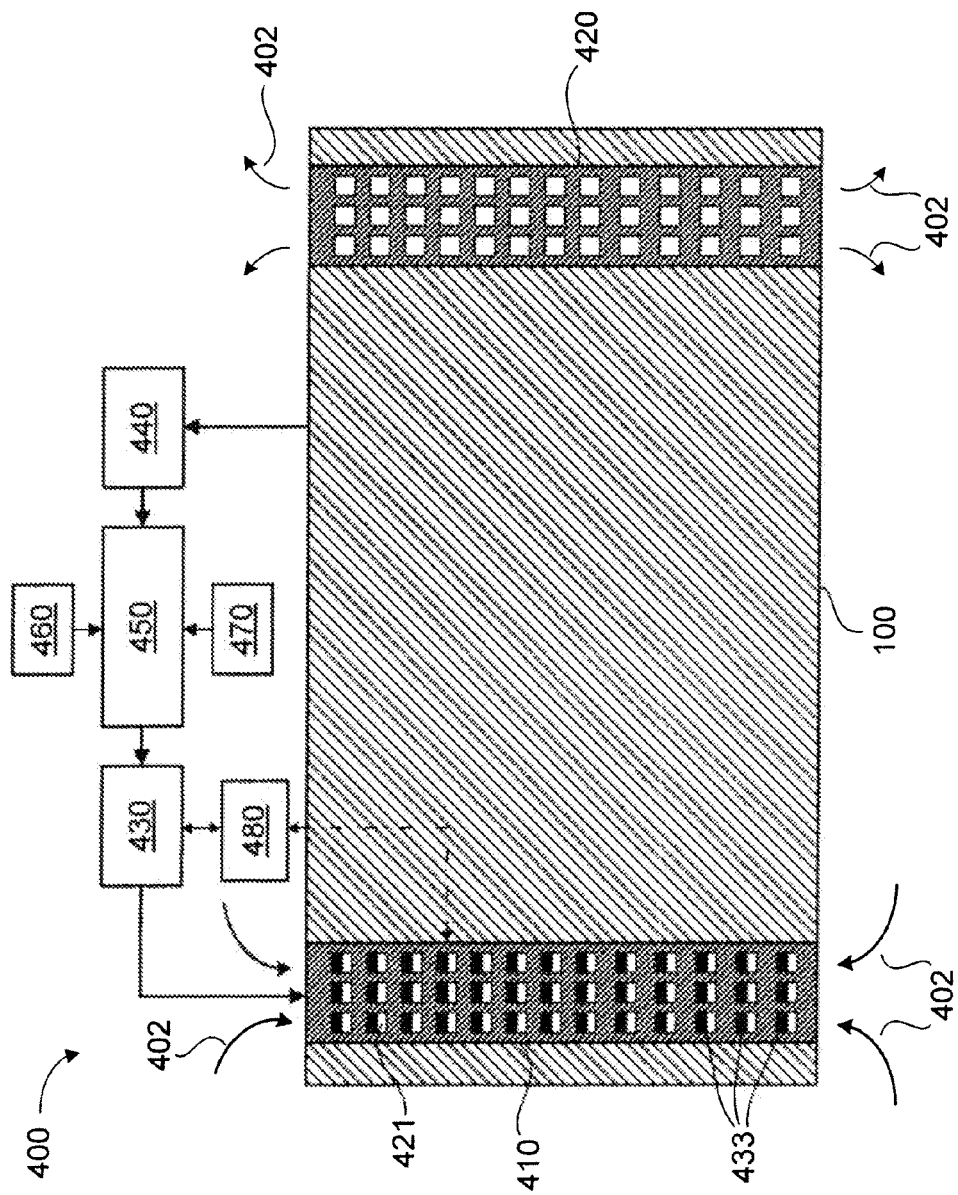
FIG. 4 illustrates a schematic view of a system for cooling a dynamoelectric machine, according to an aspect of the present invention.

FIG. 4 illustrates a schematic view of a system 400 for cooling the dynamoelectric machine 100, according to an aspect of the present invention. The flow control device 430 is located on or connected to the coolant medium inlet 410 and has a baffle device 433 (or devices) partially closed to reduce an opening area of the coolant medium inlet 410 and windows 421. As non-limiting examples only, the baffle device 433 can be configured to reduce the window 421 opening area to 10%, 20%, 30%, 40%, 50%, 60%, 70%, 80% or 90% (or any value between 0%-fully closed and 100%-fully open) of the maximum window 421 opening area. As shown in FIG. 4, the baffle 433 is about 50% open or closed, which results in about a 50% window opening area and this restricts the amount of coolant medium flow 402 through dynamoelectric machine 100.

The flow control device 430 is controlled by a winding temperature measurement system 440 and an optional control system 450. The winding temperature measurement system measures and detects the temperature of one or more windings in the dynamoelectric machine. The windings may be rotor windings and/or stator windings. If the temperature of the windings reaches a predetermined level, the flow control device can increase or decrease the opening area of windows 421. In other words, the winding temperature measurement system 440 controls the flow control device 430 to adjust the opening area of the windows 421 in the coolant medium outlet 420, based on the temperature of the windings in the dynamoelectric machine. This change in opening area of windows 421 will create a corresponding increase or decrease in the volume of coolant medium flow, and by properly adjusting the coolant medium flow volume the efficiency of the dynamoelectric machine may be enhanced by reducing windage loss.

The flow control device may also be controlled by an ambient temperature sensor 460 or a dynamoelectric machine load sensing system 470. The ambient temperature sensor 460 can sense and detect the ambient temperature and/or the temperature of the coolant medium. The load sensing system 470 can sense the load on the dynamoelectric machine 100 and control the flow control device 430 to adjust the opening area of the windows 421 in the coolant medium outlet 420, based on the current load, or predicted load on the dynamoelectric machine 100.

A flow control device monitoring system 480 may be used for monitoring operation of the flow control device 430 and for detecting malfunctions in the flow control device 430 or baffle 433. In addition, the flow control device monitoring system 480 can be configured to control the flow control device 430 to maximize the opening area of the coolant medium outlet 420, in the event a malfunction in the flow control device 430 is detected.

Figure 5:
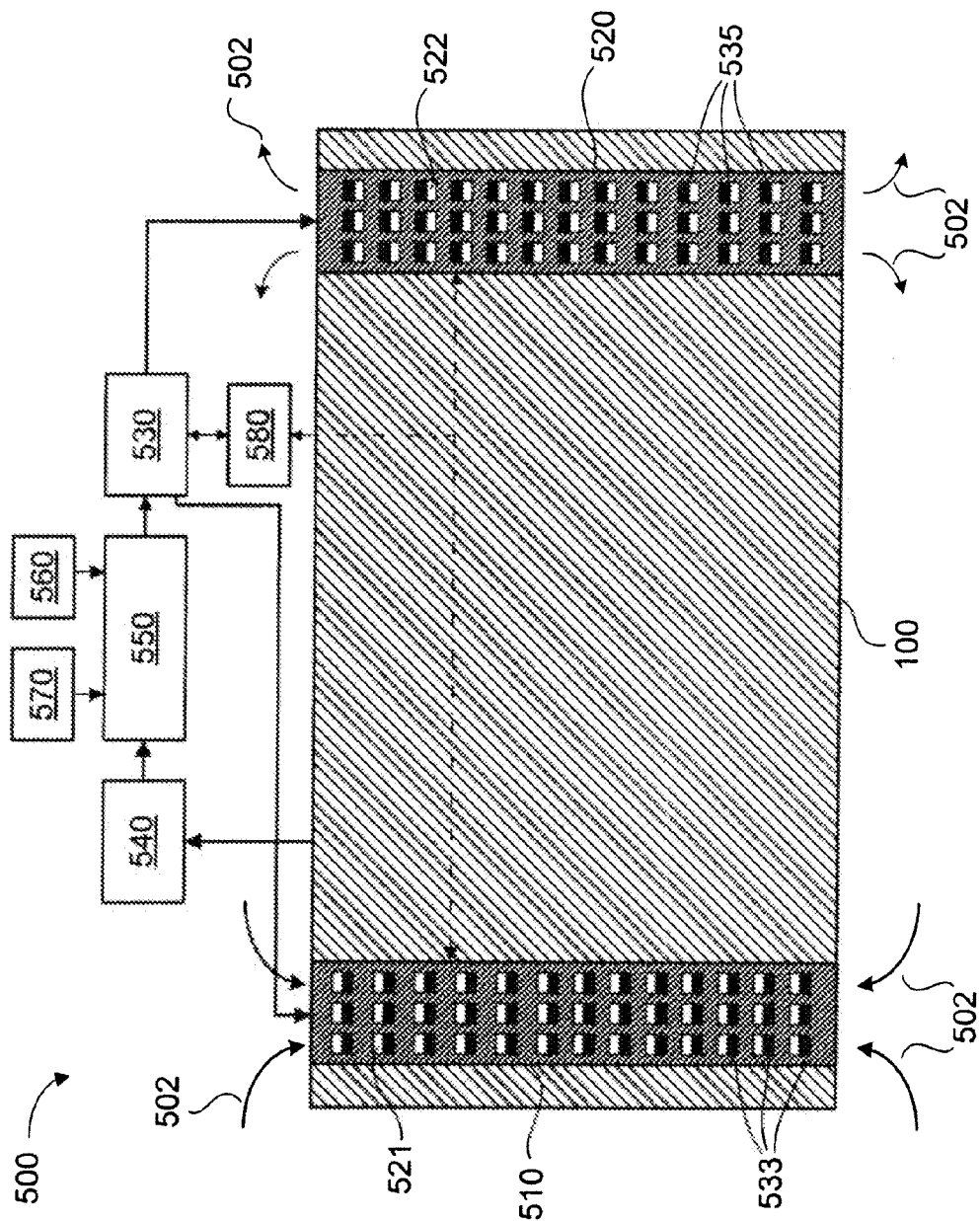
FIG. 5 illustrates a schematic view of a system for cooling a dynamoelectric machine, according to an aspect of the present invention.

FIG. 5 illustrates a schematic view of a system 500 for cooling the dynamoelectric machine 100, according to an aspect of the present invention. The flow control device 530 is connected to and/or located on the coolant medium inlet 510 and the coolant medium outlet 520. Baffle devices 533 and 535 are partially closed to reduce an opening area of both the coolant medium inlet 510 (having windows 521) and coolant medium outlet 520 (having windows 522). As non-limiting examples only, the baffle devices 533 and 535 can be configured to reduce the opening areas of windows 521 and 522 to 10%, 20%, 30%, 40%, 50%, 60%, 70%, 80% or 90% (or any value between 0%-fully closed and 100%-fully open) of the maximum window opening area. As shown in FIG. 5, the baffles 533 and 535 are about 50% open or closed, which results in about a 50% window opening area and this restricts the amount of coolant medium flow 502 through dynamoelectric machine 100.

The flow control device 530 is controlled by a winding temperature measurement system 540 and an optional control system 550. The winding temperature measurement system 540 measures and detects the temperature of one or more windings in the dynamoelectric machine. The windings may be rotor windings and/or stator windings. If the temperature of the windings reaches a predetermined level, the flow control device can increase or decrease the opening area of windows 521 and/or 522. In other words, the winding temperature measurement system 540 controls the flow control device 530 to adjust the opening area of the windows 521, 522 in the coolant medium inlet 510 and coolant medium outlet 520, based on the temperature of the windings in the dynamoelectric machine. This change in opening area of windows 521 and/or 522 will create a corresponding increase or decrease in the volume of coolant medium flow, and by properly adjusting the coolant medium flow volume the efficiency of the dynamoelectric machine may be enhanced by reducing windage loss.

The flow control device 530 may also be controlled by an ambient temperature sensor 560 or a dynamoelectric machine load sensing system 570. The ambient temperature sensor 560 can sense and detect the ambient temperature and/or the temperature of the coolant medium. The load sensing system 570 can sense the load on the dynamoelectric machine 100 and control the flow control device 530 to adjust the opening area of the windows 521, 522 in the coolant medium inlet 510 and coolant medium outlet 520, based on the current load, or predicted load on the dynamoelectric machine 100.

A flow control device monitoring system 580 may be used for monitoring operation of the flow control device 530 and for detecting malfunctions in the flow control device 530 or baffles 533 and 535. In addition, the flow control device monitoring system 580 can be configured to control the flow control device 530 to maximize the opening area of the coolant medium outlet 520, in the event a malfunction in the flow control device 530 is detected.

Figure 6:
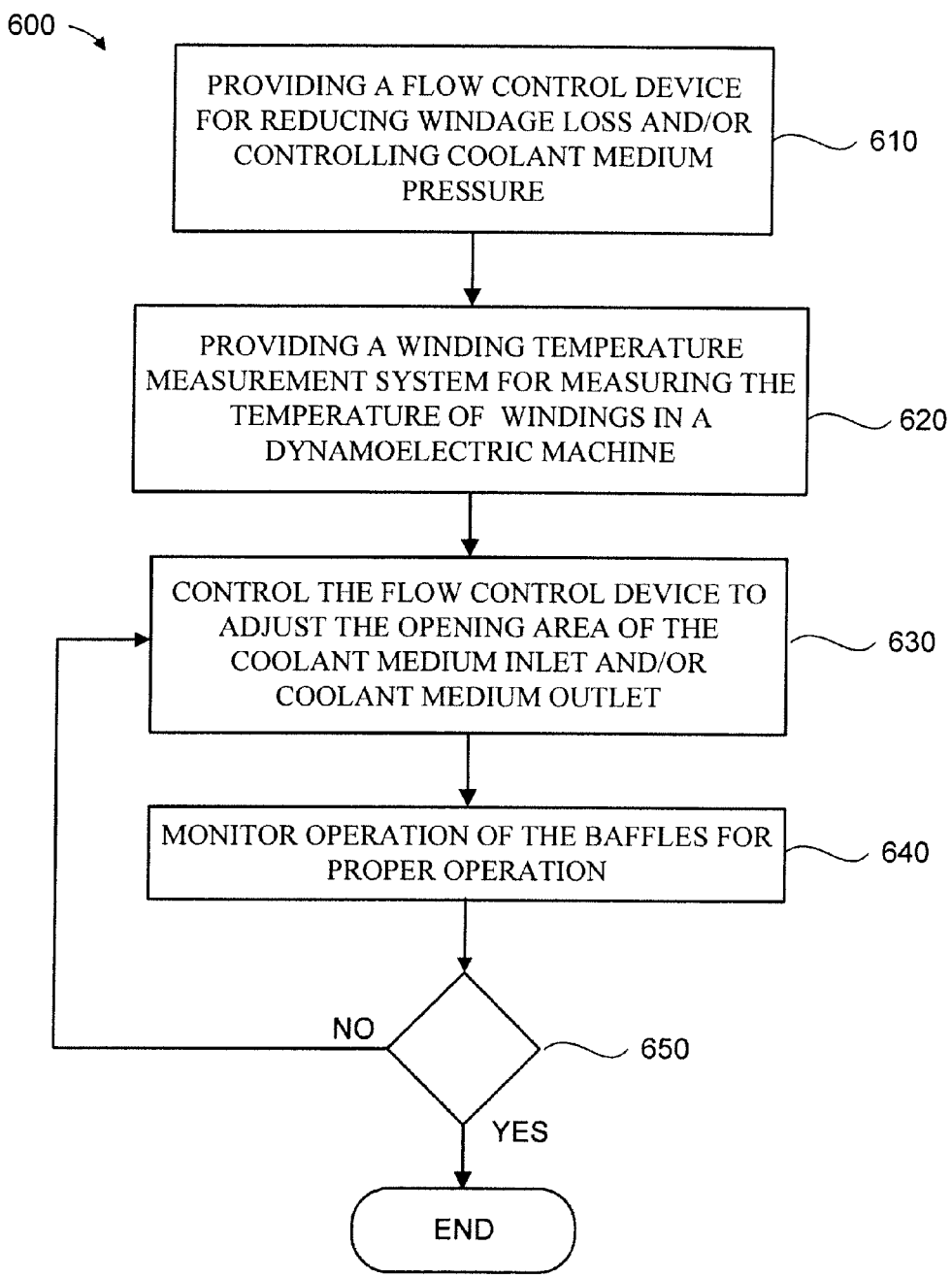
FIG. 6 illustrates a flowchart of a method for cooling a dynamoelectric machine, according to an aspect of the present invention.

FIG. 6 is a flowchart illustrating a method 600 for cooling a dynamoelectric machine, according to an aspect of the present invention. The dynamoelectric machine includes a coolant medium inlet, a coolant medium outlet, and a fan connected to a rotor of the dynamoelectric machine. The fan provides a flow of a coolant medium through the dynamoelectric machine. The method includes step 610 which provides a flow control device for reducing windage loss by controlling the amount of the coolant medium passing through the dynamoelectric machine. In addition, step 610 may additionally or alternatively control the coolant medium pressure within the dynamoelectric machine by adjusting the opening area of the coolant medium inlet and/or the coolant medium outlet. The flow control device controls an opening area of at least one of the coolant medium inlet and the coolant medium outlet (or a coolant medium aperture). An optional step 620 provides a winding temperature measurement system for measuring the temperature of one or more windings in the dynamoelectric machine. A step 630 controls the flow control device to adjust the opening area of at least one of the coolant medium inlet and the coolant medium outlet. The adjustment may be made to reduce the windage losses and/or adjust the pressure of the coolant medium within the dynamoelectric machine. The adjustment may also be based on the temperature of the one or more windings in the dynamoelectric machine. An optional step 640, monitors for proper operation of the baffles. For example, if the baffles were instructed to open by 30%, a feedback system monitors operation of the baffles and confirms if the instruction was successful. If not (decision 650), the baffles can be adjusted again or moved to a default 100% open condition. An alarm may also be generated to indicate the malfunction.

Additional steps in the method 600 can, provide a baffle device on the coolant medium inlet, provide a baffle device on the coolant medium outlet, and provide a baffle device on both the coolant medium inlet and the coolant medium outlet. In addition, the method 600 can include the step of providing a flow control device monitoring system for monitoring operation of the flow control device and detecting malfunctions in the flow control device, where the flow control device monitoring system controls the flow control device to maximize the opening area of at least one of the coolant medium inlet and the coolant medium outlet, in the event a malfunction in the flow control device is detected.

The method 600 may also include the step of providing a load sensing system for sensing a load on the dynamoelectric machine, where the load sensing system controls the flow control device to adjust the opening area of at least one of the coolant medium inlet and the coolant medium outlet, based on the load on the dynamoelectric machine. An additional step may be used for providing a flow control device monitoring system for monitoring operation of the flow control device and detecting malfunctions in the flow control device, where the flow control device monitoring system controls the flow control device to maximize the opening area of at least one of the coolant medium inlet and the coolant medium outlet, in the event a malfunction in the flow control device is detected.

In all the embodiments illustrated and described herein, the control system 250, 450, 550 may have storage means for storing a history of machine parameters, machine events or external conditions. For example, the storage means could store ambient temperature and details of the position of baffles 233, 433, 533, 535. The data can be stored in any desired temporal resolution, for example, 1 second, 1 minute, 1 hour, 1 day, or any other desired time period. Historical operating information can be used to reduce the response time of the overall system. The flow control device monitoring system 280, 480, 580 may receive feedback (illustrated by dotted lines) from the baffles or other sensors to monitor proper operation. For example, if the flow control device commands the baffles to close to 50%, then feedback from the baffles or other sensors can confirm if the command was successfully completed. If a malfunction occurs (for example, the baffles do not open or close by the desired amount), then an alarm can be generated and transmitted. The alarm could be visual, audible or an electronic signal. The alarm indication could be located on the machine, machine panel, flow control device or be remotely located in a control room, operator room or portable device (for example, mobile telephone, mobile computer, etc.). The alarm could be transmitted by wired or wireless communication channels. Further in the event of a malfunction, the system can open the baffle to 100% open as a fail safe mode to protect the dynamoelectric machine from overheating or other issues.

A few non-limiting benefits of the present invention, are that the machine can improve warm-up time in cold climates by closing the inlet baffles and/or outlet baffles. In this manner the machine may avoid the need for additional heaters for start-up in cold climates. Typically, supplemental heaters are powered by the machine, so eliminating or reducing use of supplemental heaters can reduce start-up loss. The reduction of windage loss by controlling and improving the volume of coolant flow also increases efficiency. Baffle adjustment, via the flow control device, can increase or decrease the coolant medium pressure as desired during the various operational conditions of the machine. Further, in all the embodiments illustrated and/or described herein, the coolant medium inlet and coolant medium outlet may both be defined as a coolant medium aperture, either alone or combined.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for cooling a dynamoelectric machine, the system comprising:
 a coolant medium inlet;
 a coolant medium outlet;
 a fan connected to a rotor of the dynamoelectric machine, the fan configured to provide a flow of a coolant medium through the dynamoelectric machine;
 a flow control device configured to control the amount of the coolant medium passing through the dynamoelectric machine by controlling an opening area of at least one of the coolant medium inlet and the coolant medium outlet; and a winding temperature measurement system configured to measure and detect the temperature of one or more windings in the dynamoelectric machine, in response to detecting that the temperature of the one or more windings in the dynamoelectric machine is above a predetermined level, the winding temperature measurement system is configured to control the flow control device by adjusting the opening area of at least one of the coolant medium inlet and the coolant medium outlet to at least one of reduce windage loss and control coolant medium pressure within the dynamoelectric machine.

2. The system of claim 1, wherein the flow control device comprises a baffle device on at least one of the coolant medium inlet and the coolant medium outlet.

3. The system of claim 1, further comprising:

a flow control device monitoring system configured to monitor operation of the flow control device and to detect malfunctions in the flow control device, wherein, in the event a malfunction in the flow control device is detected, the flow control device monitoring system is configured to control the flow control device to maximize the opening area of at least one of the coolant medium inlet and the coolant medium outlet.

4. The system of claim 1, further comprising:

a load sensing system configured to sense a load on the dynamoelectric machine, wherein, based on the load on the dynamoelectric machine, the load sensing system is configured to control the flow control device to adjust the opening area of at least one of the coolant medium inlet and the coolant medium outlet.

5. A method for cooling a dynamoelectric machine, the dynamoelectric machine comprising a coolant medium inlet, a coolant medium outlet, and a fan connected to a rotor of the dynamoelectric machine, the fan configured to provide a flow of a coolant medium through the dynamoelectric machine, the method comprising:

providing a flow control device configured to control the amount of the coolant medium passing through the dynamoelectric machine;

providing a winding temperature measurement system configured to measure and detect the temperature of one or more windings in the dynamoelectric machine; and in response to detecting that the temperature of the one or more windings in the dynamoelectric machine is above a predetermined level, controlling, by the winding temperature measurement system, the flow control device to adjust the opening area of at least one of the coolant medium inlet and the coolant medium outlet based on the temperature of the one or more windings in the dynamoelectric machine, to at least one of reduce windage loss and control coolant medium pressure within the dynamoelectric machine.

6. The method of claim 5, further comprising:
providing a baffle device on the coolant medium inlet.

7. The method of claim 5, further comprising:
providing a baffle device on the coolant medium outlet.

8. The method of claim 5, further comprising:
providing a baffle device on both the coolant medium inlet and the coolant medium outlet.

9. The method of claim 5, further comprising:

providing a flow control device monitoring system configured to monitor operation of the flow control device and to detect malfunctions in the flow control device; and controlling the flow control device with the flow control device monitoring system to maximize the opening area of at least one of the coolant medium inlet and the coolant medium outlet in the event a malfunction in the flow control device is detected.

10. The method of claim 5, further comprising:

providing a load sensing system configured to sense a load on the dynamoelectric machine; and controlling the flow control device with the load sensing system to adjust the opening area of at least one of the coolant medium inlet and the coolant medium outlet based on the load on the dynamoelectric machine.

11. The method of claim 10, further comprising:
providing a baffle device on the coolant medium inlet.

12. The method of claim 10, further comprising:
providing a baffle device on the coolant medium outlet.

13. The method of claim 10, further comprising:
providing a baffle device on both the coolant medium inlet and the coolant medium outlet.

14. The method of claim 10, further comprising:

providing a flow control device monitoring system configured to monitor the operation of the flow control device and detect malfunctions in the flow control device; and controlling the flow control device with the flow control device monitoring system to maximize the opening area of at least one of the coolant medium inlet and the coolant medium outlet in the event a malfunction in the flow control device is detected.

* * * * *